United States Patent
Smith

[15] 3,694,643
[45] Sept. 26, 1972

[54] SYSTEM AND METHOD OF CHANNEL PERFORMANCE MONITORING

[72] Inventor: Donald A. Smith, Schenectady, N.Y.
[73] Assignee: General Electric Company
[22] Filed: Sept. 30, 1970
[21] Appl. No.: 76,829

[52] U.S. Cl..............235/181, 178/69 A, 235/150.3, 324/57 PS, 324/77 H, 325/67
[51] Int. Cl.....................G01r 31/28, G06f 15/34
[58] Field of Search...235/181, 150.3, 150.31, 150.5, 235/150.6, 150.53; 324/57 R, 57 PS, 77 G, 77 H; 178/69 A; 325/42, 65, 67

[56] References Cited

UNITED STATES PATENTS

| | | | |
|---|---|---|---|
| 3,249,911 | 5/1966 | Gustafsson | 235/181 X |
| 3,350,644 | 10/1967 | McNair | 325/65 X |
| 3,430,149 | 2/1969 | Williams | 235/181 X |
| 3,517,175 | 6/1970 | Williams | 235/181 X |

OTHER PUBLICATIONS

Briggs et al. Correlation analysis of Process dynamics Proc. Inst. of Mech. Eng. 1964– 1965 Vol. 179 Pf 3H, TJ 212 c68 p. 37/51.
Truxall (Book) Aut. Feedback Control Systems Mc-Graw– Hill 1955 TJ214– T7 pages 437– 439.
Hewlett– Packard Journal Nov. 1969

Primary Examiner—Felix D. Gruber
Attorney—Paul A. Frank, John F. Ahern, Julius J. Zaskalicky, Louis A. Moucha, Frank L. Neuhauser, Oscar B. Waddell and Joseph B. Forman

[57] ABSTRACT

The channel impulse response of a communication channel is determined from measurement of the cross correlation between the channel output signal and a delayed locally generated pseudorandom noise sequence signal. The undelayed pseudorandom noise sequence signal is utilized as a probe signal and is added to any information signal prior to being supplied to the communication channel being monitored. The output of the channel is hard limited and polarity-coincidence compared to the time-delayed pseudorandom noise sequence signal.

11 Claims, 4 Drawing Figures

Inventor
Donald A. Smith
by Louis A. Moncha

Inventor
Donald A. Smith,
by Louis A. Moncha

SYSTEM AND METHOD OF CHANNEL PERFORMANCE MONITORING

My invention relates to system and a method for determining the impulse response of a communication channel, and in particular, to a system and method using a pseudorandom noise sequence as a probe signal transmitted through a wide bandwidth channel simultaneously with an information signal and determining the channel impulse response from measurements employing polarity coincidence correlation techniques.

The performance of a communication channel over a particular frequency bandwidth is required to be known in determining the capability of such channel for transmitting information with distortion not exceeding prescribed limits. Thus, the performance or transmission characteristics of the channel limits the effective bandwidth of such channel. A measurement or determination of the impulse response of the communication channel is a most convenient means for monitoring channel performance. The channel impulse response may be defined as the time response of the channel to a unit impulse function, any deviation of the time response at the output of the channel from the unit impulse function being due to amplitude and phase distortion which is characteristic of the particular channel being monitored.

Several techniques are available for channel performance monitoring, that is, determining the channel impulse response. One particular technique for channel monitoring, an improved version being the subject of my invention, is the use of a pseudorandom noise sequence as a probe signal which is transmitted through the channel simultaneously with any information or data signal. Cross correlation analysis between the combined information and pseudorandom signal at the channel output and the probe signal yields the channel impulse response as described in an article by J.D. Balcomb, H.B. Demuth and E.P. Gyftopoulos, "A Cross Correlation Method for Measuring the Impulse Response of Reactor Systems," Nuclear Science and Engineering, Vol. 11, 1961, pps. 159–166. In another article by C.R. Abbey, "Data Channel Monitoring by Correlation Techniques," IEEE Transactions on Aerospace and Electronic Systems, January 1968, pps. 58–64, such technique is also described, in both cases the correlator being of an analog type, that is, employing an analog multiplier and integrator. The analog type correlator is satisfactory for narrow channel bandwidth applications and where the distortion to be measured is relatively large, but in the case of a wide channel bandwidth, small distortion application, which is the subject of my invention, the analog correlator technique is not satisfactory since the accuracy of multiplication linearity is limited and the analog integrator may introduce excessive drift during the integration time required by such analog or direct correlation technique.

An alternative to direct correlation is polarity coincidence correlation. An article by L.E. Zegers, "Common Bandwidth Transmission of Information Signals and Pseudonoise Synchronization Waveforms," IEEE Transactions on Communication Technology, Vol. COM–16, No. 6, December 1968, pages 796–807, describes the polarity coincidence correlation technique in a synchronization system not adapted to yield the channel impulse response which is the object of applicant's invention. The channel bandwidth in the Zeger's article is also much more narrow than the requirement for applicant's channel to be described hereinafter. Finally, a U.S. Pat., No. 3,404,261 to P.G.A. Jespers et al. is also based on the polarity coincidence correlation technique but is a much more complex system than applicant's invention and requires a variable reference signal whose slope is random, and the functions to be correlated are restricted to amplitude range limits within the range of the variable reference level.

Therefore, one of the principal objects of my invention is to provide a new system and method for monitoring the performance of a wide bandwidth, small distortion level communication channel.

Another object of my invention is a system and method for determining the impulse response of the communication channel by employing polarity coincidence correlation.

A still further object of my invention is to provide a system and method for determining the impulse response during the simultaneous transmission of other signals, such as information signals, through the channel.

Briefly stated, my invention is a channel performance monitoring system which uses a pseudorandom noise sequence as a probe signal which may be transmitted simultaneously with an information signal through the channel being monitored, the circuitry at the output of the channel being adapted for measurement of the cross correlation between the channel output signal and a delayed locally generated pseudorandom noise sequence signal by means of polarity coincidence correlation. The output of the channel is hard limited and compared to the time-delayed pseudorandom noise sequence signal in a modulo 2 adder which indicates when the bit levels or polarity of the two input signals agree (coincide) or disagree (differ). The output of the modulo 2 adder is connected to a reversible counter which counts the difference between the total number of agreements and disagreements in the bit levels or polarity of the modulo 2 adder input signals from which the cross correlation between the signal at the output of the channel and the time-delayed pseudorandom noise sequence is determined. The impulse response of the channel may then be determined from the cross correlations measured for various time delays in the pseudorandom noise sequence.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
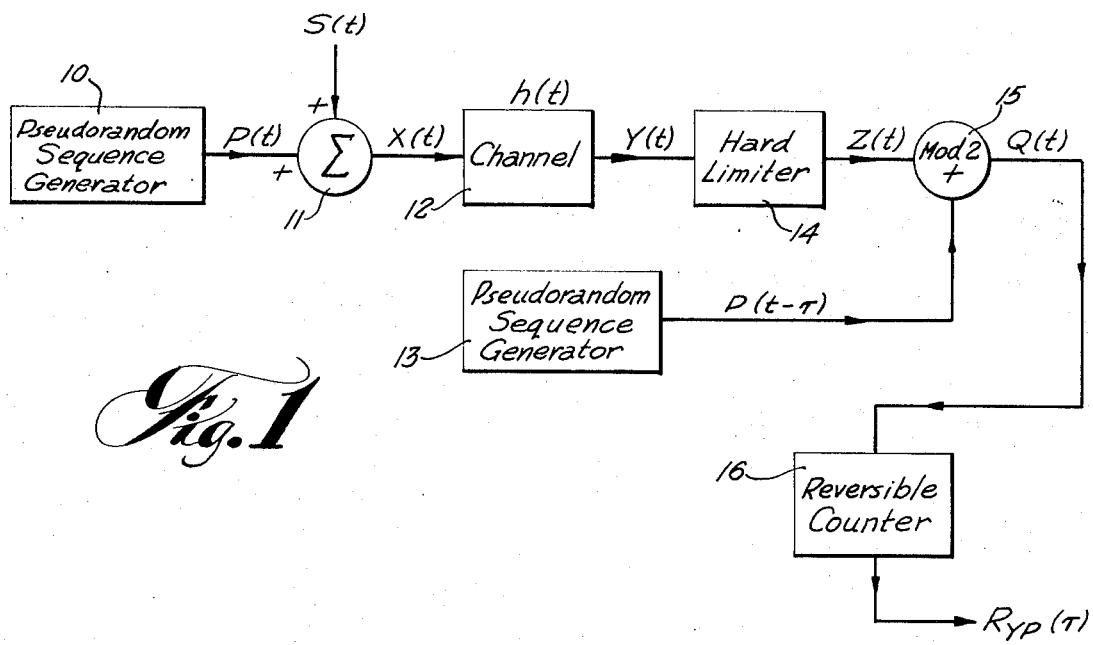
FIG. 1 is a block diagram of a first embodiment of my invention.

Referring now in particular to FIG. 1, there is shown a system including a pseudorandom noise sequence generator 10 which generates a pseudonoise probe signal P(t). Probe signal P(t) is a pulse signal wherein each pulse leading edge coincides with a clock pulse generated in circuit 10, but the period is a random integral number of the clock pulse period. Probe signal P(t) and signal S(t), which may represent an information or data signal (in digital or analog form) and any noise superimposed thereon, (it being assumed that both the data signal and noise are uncorrelated with the probe signal) are combined in any conventional electrical voltage signal summing device 11 such as a two-input summing operational amplifier. The summed signal X(t) is the input to a communication channel 12 whose performance is to be monitored by the determination of the impulse response h(t) thereof. The received or output signal of channel 12 is designated Y(t) and may be expressed as:

$$Y(t) = \int_{-\infty}^{\infty} h(t_1)[P(t-t_1) + S(t-t_1)]dt_1 \quad (1)$$

The cross correlation between the received signal Y(t) and the probe signal P(t) is:

$$R_{YP}(\tau) = \lim_{T \to \infty} \frac{1}{2T} \int_{-T}^{T} Y(t) P(t-\tau) dt \quad (2)$$

where $\tau$ is the delay between the received signal Y(t) and a locally generated probe signal which may be generated by a second pseudorandom noise sequence generator 13. As indicated in the above-identified Abbey article, the substitution of equation (1) and (2), under the assumption that the data signal S(t) is uncorrelated with the probe signal P(t), yields:

$$R_{YP}(\tau) = \int_{-\infty}^{\infty} h(t_1) R_{PP}(t_1-\tau) dt_1 \quad (3)$$

The cross correlation function of equation (3) is solved by a relatively time consuming process and, fortunately, a good approximation of the solution is obtained if the probe signal is such that its autocorrelation function $R_{PP}(\tau)$ approximates a unit impulse $u_o(\tau)$ whereby equation (3) simplifies to:

$$R_{YP}(\tau) = H(\tau) \quad (4)$$

An $n$ stage shift register with feedback can produce a maximal length linear binary sequence (pseudonoise sequence) which is repetitive with length $2^n - 1$ bits and exhibits a quasi-impulse autocorrelation function. The normalized autocorrelation function of such a sequence for $\tau < T_o$, where $T_o$ is the period of the sequence, is:

$$R_{PP}(\tau) = \begin{cases} 1 - \frac{|\tau|}{\delta} \frac{2^n}{2^n-1}, & |\tau| \leq \delta \\ -\frac{1}{2^n-1}, & |\tau| > \delta \end{cases} \quad (5)$$

where $\delta$ is the duration of one bit. The autocorrelation function $R_{PP}(\tau)$ is repetitive with period $T_o$ and in order to achieve the result of equation (4), the autocorrelation function must be a reasonably good approximation to a unit impulse function. This is achieved when the pulse duration $\delta$ is sufficiently small, that is, the pulse duration of a bit in the pseudorandom noise sequence P(t) is less than the reciprocal of the channel bandwidth, the sequence period $T_o$ must be sufficiently long to prevent appreciable overlap of the periodically repeated channel impulse responses, and the amplitude $(2^n-1)^{-1}$ is small compared to amplitude variations which are to be detected, where $n$ is the number of bits in the sequence. Under these latter conditions, the cross correlation $R_{YP}(\tau)$ is proportional to the impulse response of the channel and may be expressed as:

$$R_{YP}(\tau) = R_{YP}(o) h(\tau) \quad (6)$$

where $R_{YP}(o)$ is dependent on the probability distribution function of data signal S(t).

Pseudorandom noise sequence generators 10 and 13 may therefore be conventional shift registers with feedback, the time delay $\tau$ for the locally generated pseudorandom noise sequence signal $P(t-\tau)$ being provided by the clock frequency pulses entering the shift register at a different stage from that of generator 10 or taking the output of the shift register at a different stage. Alternatively, generators 10 and 13 may be identical (or just one generator employed), and a variable time delay network is connected to the output of generator 13.

Since one of the advantages of my invention is the ability to monitor the channel performance while the probe signal P(t) is being transmitted simultaneously with the data signal S(t), the effect of the signal-to-probe ratio on the measurement of the cross correlation function must be considered. As such ratio increases, the cross correlation function $R_{YP}(\tau)$ becomes increasingly difficult to measure using direct correlation techniques since the accuracy of measurement is dependent on analog multiplication linearity and integrator drift limitations during the required processing time. The alternative to direct correlation, which I employ in my invention, is polarity coincidence correlation. Polarity coincidence correlation is accomplished by hard limiting the communication channel 12 output signal Y(t) and comparing the polarity (or bit level) thereof with the polarity (or bit level) of the locally generated probe signal $P(t-\tau)$. Thus, the output of channel 12 is connected to the input of a hard limiter circuit 14 which develops a two-level signal Z(t) at its output as a function of the relative magnitudes of the channel signal Y(t). Channel signals of voltage magnitude greater and smaller than a predetermined value established by a bias voltage B in the hard limiter circuit 14 develop the higher and lower voltage level signals Z(t), respectively. Limiter circuit 14 output signal Z(t) is supplied as a first input to a modulo 2 adder (exclusive OR logic circuit) 15. The signal at the output of hard limiter 14 is, as stated above, a two-level or may be a bipolarity signal and these two levels (or polarities) are compared on a (clock) bit-by-bit basis with the two levels (or polarities) of delayed probe signal $P(t-\tau)$ supplied as a second input to the modulo 2 adder 15. The output $Q(t)$ of modulo 2 adder 15 yields one level when the levels or polarities of the two input signals $Z(t)$ and $P(t-\tau)$ agree, and another level when the input levels or polarities disagree. The two-level signal $Q(t)$ may be of the same voltage polarity or may be a positive voltage when the polarities (or levels) of the two input signals agree and a negative voltage when the polarities (or levels) disagree. The output of modulo 2 adder 15 is supplied to the input of a conventional reversible counter 16 such that the count output thereof is the difference between the total number of agreements and the total number of disagreements in the bit levels (or polarities) of the two input signals to the modulo 2 adder.

The cross correlation $R_{YP}(\tau)$ between the signals $Y(t)$ and $P(t-\tau)$ can be expressed as:

$$R_{YP}(\tau) = \frac{\text{number of agreements} - \text{number of disagreements}}{\text{number of agreements} + \text{number of disagreements}} \quad (7)$$

Since the sum of the total number of agreements and the total number of disagreements is the total number of bits compared, the output of the reversible counter 16 divided by the total number of bits transmitted is the cross correlation $R_{YP}(\tau)$.

The factor previously limiting the use of pseudorandom sequences to monitor wideband data channel i.e., bandwidth greater than 1 MHz) to within a desired accuracy corresponding to a very small distortion level is the lack of a suitable analog correlator, as stated above. My digital (polarity coincidence) correlator, which includes elements 13, 14, 15, 16 eliminates the problems of insufficient linearity and drift associated with the analog multiplier and integrator in the analog correlator. However, the digital correlator in FIG. 1 has the disadvantage, noted in equation (6), of the amplitude of the measured correlation function being dependent on the distribution of the transmitted data signal $S(t)$, thereby introducing errors during the transmission of arbitrarily varying data signals.

Figure 2:
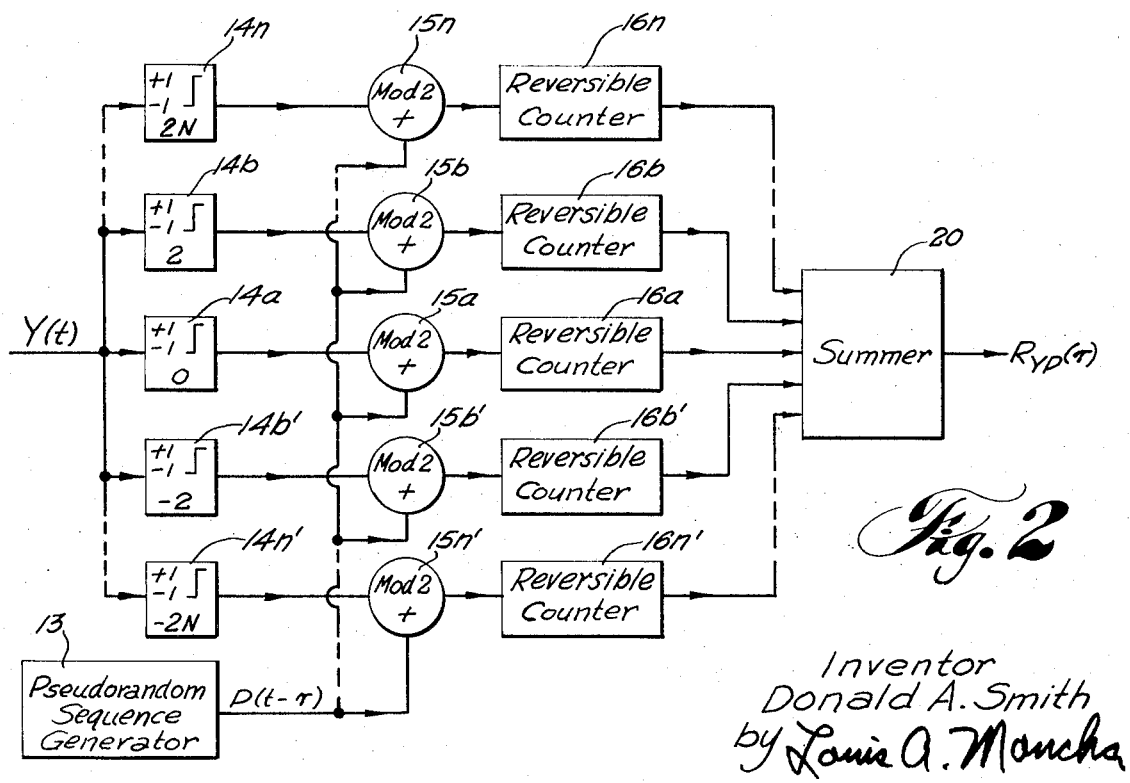
FIG. 2 is a block diagram of a second embodiment of my invention wherein the cross correlation function is not dependent on distribution of the information signal as in the FIG. 1 embodiment.

FIG. 2 illustrates a second embodiment of my channel performance monitoring system, and in particular, a system wherein the cross correlation function $R_{YP}(\tau)$ is independent of the probability distribution of the data signal $S(t)$ as distinguished from the FIG. 1 embodiment. The system in the FIG. 2 embodiment utilizes an array of $2N + 1$ digital correlators of the type illustrated in FIG. 1 and utilizes different fixed bias levels $(0, 2, -2, \ldots 2N, -2N)$ volts, as one example, for the hard limiters 14a through 14n and 14n' which each have output levels of $\pm 1$ volt in such exemplary circuit. Thus, a bias of $+2$ volts means that whenever the input signal $Y(t)$ is greater than $+2$ volts, the output is at the upper ($+1$ volt) level and when less than $+2$ volts, the output is at the lower ($-1$ volt) level. N is the number of correlators added to obtain measurements at voltage levels greater than zero. N additional correlators are utilized to obtain measurements at levels less than zero. These correlators plus the one that measures at the zero level accounts for the total of $2N + 1$, and specifying N in this manner allows the summation of equation (9) to go from $-N$ to $+N$. When the pseudorandom noise sequences are correlated, the cross correlation of this configuration becomes $$R_{YP}(\tau) = R_{YP}(o)h(\tau) \quad (8)$$

where $$R_{YP}(o) = \sum_{m=-N}^{N} F_{\tilde{s}}(2m+1) - F_{\tilde{s}}(2m-1)$$
$$= F_{\tilde{s}}(2N+1) - F_{\tilde{s}}(-2N-1) \quad (9)$$

where $F_{\tilde{s}}(s)$ is the probability distribution function. As $N$ increases, the effect of the data signal becomes less significant and for $N$ sufficiently large:

$$F_{\tilde{s}}(2N+1) = 1$$
$$F_{\tilde{s}}(-2N-1) = 0 \quad (10)$$

resulting in $$R_{YP}(0) = 1 \quad (11)$$

which is the ideal result.

Each digital correlator in my FIG. 2 embodiment has the input thereof supplied from the output $Y(t)$ of the communication channel 12 and includes a hard limiter, a modulo 2 adder supplied with inputs from the limiter and a common local pseudorandom sequence generator 13, and a reversible counter. The outputs of the $2N + 1$ counters are supplied to the input of a digital summer 20 which provides the difference between the total number of agreements and total number of disagreements signal $R_{YP}(\tau)$ as does the reversible counter 16 in the FIG. 1 embodiment. A further advantage of my FIG. 2 embodiment is that it reduces the total measurement time for processing the several $R_{YP}(\tau)$ measurements. This shortening of the total measurement time is due to the fact that when the amplitude of the probe signal is small compared to the data signal (a desirable and the general condition), the only contribution to the correlation measurement occurs for signal levels close to the decision level of the hard limiter. The introduction of a number of decision levels allows correlation measurements to be made over a larger amplitude range thereby reducing the time required for a given accuracy.

Figure 3:
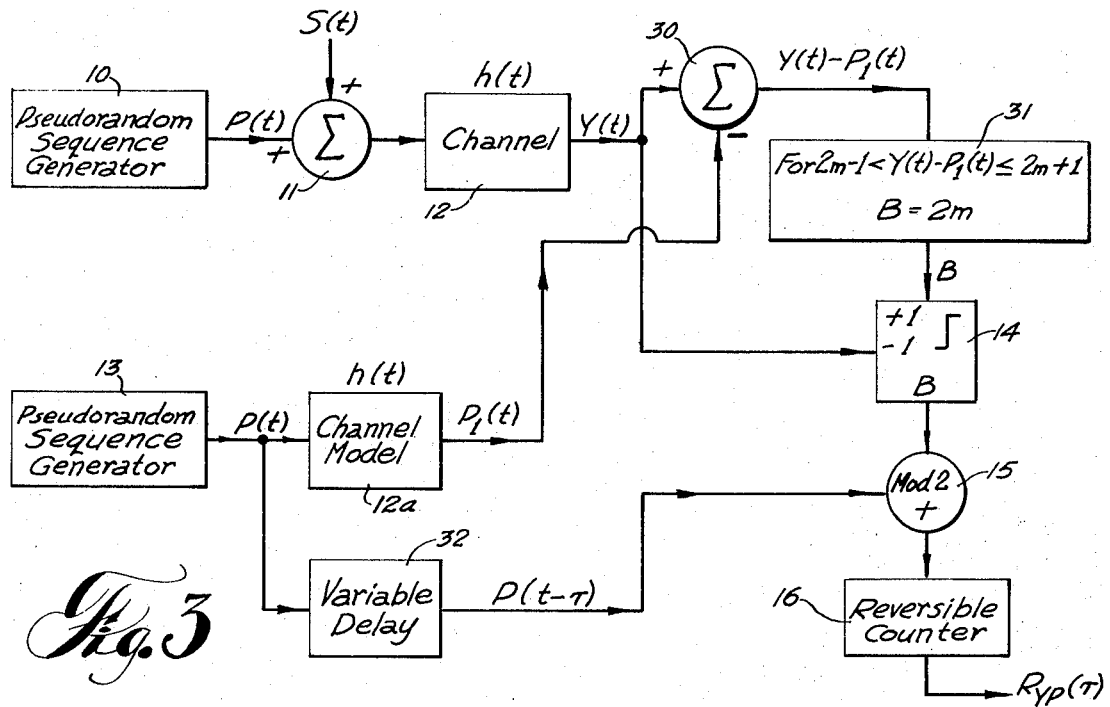
FIG. 3 is a block diagram of a third embodiment of my invention wherein only a single hard limiter is employed and is provided with a variable bias voltage for eliminating the dependency of the cross correlation function on the distribution of the information signal.

FIG. 3 illustrates a third embodiment of my channel performance monitoring system and a second means for eliminating the dependency of the cross correlation function on the probability distribution function of the data signal $S(t)$. The hard limiter 14 in the digital correlator has a bias voltage level B supplied thereto that is automatically varied in predetermined steps, the limiter bias level being determined by the received signal level $Y(t)$. The limiter bias level signal B is variable in steps of $2m$ (volts) where $m$ is an integer as in equation (9) and covers the range $-N$ to $+N$ which corresponds to the range from the minimum value of $\frac{1}{2}[Y(t) - P_1(t)]$ to the maximum value, and this has the effect of replacing the array of $2N + 1$ limiters in the FIG. 2 embodiment with a single limiter thereby requiring only a single modulo 2 adder 15 and single reversible counter 16. The step variable bias voltage signal B is obtained by cancelling the effect of the pseudorandom noise sequence signal $P(t)$ in the received signal $Y(t)$ at the output of channel 12. Local pseudorandom noise sequence generator 13 provides the identical output signal $P(t)$ as generator 10 (i.e., no delay $\tau$ as in FIGS. 1 and 2) and is connected to the input of a communication channel model 12a having identical impulse response characteristics $h(t)$ as communication channel 12. The signal at the output of channel model 12a is designated $P_1(t)$. Signals $Y(t)$ and $P_1(t)$ are subtracted in a conventional differential amplifier circuit 30, and the output signal thereof $Y(t) - P_1(t)$ is supplied to a conventional quantizing circuit 31 which functions to replace the continuous input signal $Y(t) - P_1(t)$ with a discrete signal. During any specified time interval, the discrete signal occupies one of several specified output voltage levels B as determined by the voltage level of the input signal. The step variable bias signal B at the output of circuit 31 is supplied to hard limiter circuit 14. The received signal $Y(t)$ is also supplied to the hard limiter as in the FIGS. 1 and 2 embodiment. The output of the pseudorandom noise sequence generator 13 is also supplied to a variable delay circuit 32 which provides the delayed pseudorandom noise sequence signal $P(t-\tau)$ as in the case of the output of generator 13 in the FIGS. 1 and 2 embodiments. Modulo 2 adder circuit 15 compares the signal level (or polarity) of the output of hard limiter 14 and variable delay circuit 32 on a bit-by-bit basis as in the case of the FIG. 1 embodiment, and the output of modulo 2 adder 15 is supplied to the reversible counter 16 which measures the difference between the total number of agreements and total number of disagreements in the bit levels of the two input signals of the modulo 2 adder circuit 15. The FIG. 3 embodiment thus has the advantage of the FIG. 2 embodiment in that the cross correlation function $R_{YP}(\tau)$ is not dependent on the probability distribution of data signal $S(t)$ and the further advantages of using fewer components than the FIG. 2 embodiment.

Figure 4:
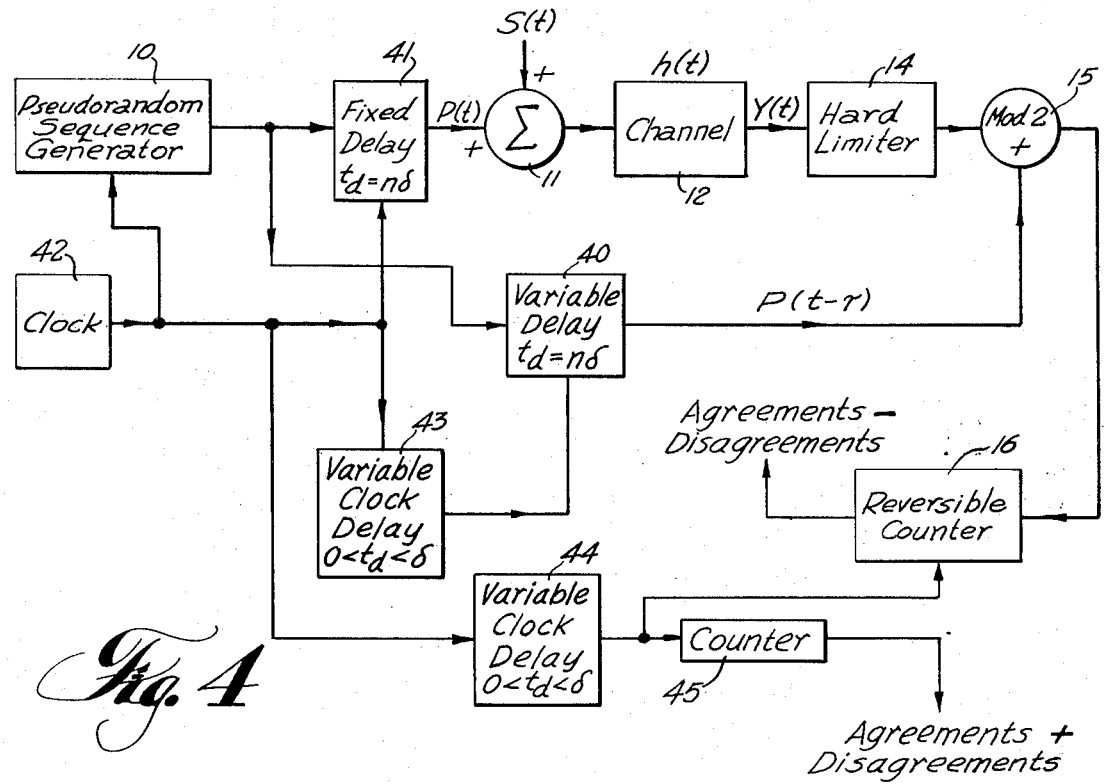
FIG. 4 is a block diagram of a system utilized for testing the FIG. 1 system.

FIG. 4 illustrates an experimental embodiment of my channel monitoring system for verifying the analytical results described by equations (6) and (7). The system is essentially that of FIG. 1 but utilizing only a single pseudorandom noise sequence generator 10. The delayed pseudorandom noise sequence signal $P(t-\tau)$ is obtained by passing the generator 10 output signal through a variable delay network 40. The output of generator 10 is also passed through a fixed delay network 41. Delay networks 40 and 41 are each adapted to effect time delays $t_d$ of an integral number of clock periods ($n\delta$). For the particular experiments described hereinafter, fixed delay network 41 was adjusted to provide a fixed time delay of 20 clock periods and variable time delay network 40 was adapted to provide time delays up to 40 clock periods such that time delay $\tau$ could vary from $-20$ to $+20$ clock periods. It should be understood that the digital clock 42 is an inherent part of the pseudorandom sequence generator and is also utilized for triggering the counter, but is not illustrated in FIGS. 1, 2, 3 for purposes of simplification. A first variable clock delay circuit 43 is connected between the output of clock 42 and a second input to variable delay circuit 40 for delaying the clock pulse thereto a fraction of one clock period $0 < t_d < \delta$ to compensate for the time delay of the signals passing through summer 11 and hard limiter 14 but excluding the time delay of channel 12. A second variable clock delay circuit 44 is connected between the output of clock 42 and the triggering input of reversible counter 16 and is adapted to provide a time delay of a fractional clock period for purposes of centering the clock pulses on the modulo 2 adder output signal $Q(t)$. The output of variable clock delay circuit 44 is also supplied to a second counter 45 which provides at the output thereof the total number of clock periods, i.e., the sum of the total number of agreements and total number of disagreements. Thus, the output of reversible counter 15 divided by the output of counter 45 determines the cross correlation $R_{YP}(\tau)$.

In the experiments, correlation measurements were successfully made for signal-to-probe ratios in a range from 1 to 100 and prove that the system is capable of measuring the channel impulse response when an interfering signal, data signal $S(t)$, is present. The results of these measurements also showed a satisfactory agreement between the measured and calculated channel impulse response. From the above experimental measurements and additional data, it has been determined that the channel performance monitoring systems disclosed in the FIGS. 1, 2 and 3 embodiments are capable of monitoring a communication channel having a bandwidth limited only by available logic circuitry. Current logic circuitry should allow monitoring of channels of up to 50 MHz bandwidth and for detecting very small distortions (amplitude variation as small as 0.1 dB and 0.5° deviation from linear phase over the bandwidth). The cross correlation measurements can be made with a probe signal level as low as one one-hundredth of the data signal amplitude to thereby minimize interference with the data signal transmission to a negligible amount. The observation time for a single cross correlation measurement $R_{YP}(\tau)$ is a function of the required accuracy (minimum distortion to be detected) and the total observation time for all the measurements is also a function of the channel characteristics. The analog correlator approach described in the Abbey article and the other prior art systems described hereinabove are not capable of meeting such strict requirements nor are they adapted for monitoring such wide band data channels in real time. The FIGS. 2 and 3 embodiments reduce measurement time over conventional analog or digital correlator channel monitors, and allow measurements having the accuracy of the FIG. 1 embodiment. Although the FIG. 1 embodiment does not reduce measurement time over the prior art, it does allow measurements to be made over longer times in order to increase measurement accuracy.

From the foregoing description, it can be appreciated that my invention makes available a new system and method for monitoring the performance of a communication channel which is especially adapted for wide bandwidth channels having very small distortion requirements, although it is obviously also useful with more narrow bandwidth channels and less strict distortion requirements. Having described three particular embodiments of my invention, the intended scope of my invention is defined by the following claims.

What I claim as new and desire to secure by Letters Patent of the United States is:

1. A communication channel performance monitoring system for determining the impulse response of a communication channel having an input and output by employing polarity coincidence correlation for obtaining measurement of cross correlation between the channel output signal and a delayed locally generated pseudorandom noise sequence probe signal and comprising first generating means in communication with an input to a communication channel being monitored for generating clock pulses and a first two-level pseudorandom noise sequence probe pulse signal in response to the clock pulses wherein the leading edges of the probe signal pulses coincide with the clock pulses and the periods of the probe signal pulses are random integral numbers of a clock pulse period, summing means connected between an output of said first generating means and the input to the communication channel for summing the probe signal and a data signal simultaneously transmitted through the channel, the probe signal being uncorrelated with the data signal and having a voltage level as low as one and one-hundredth of the amplitude of the data signal to thereby minimize interference with the data signal transmission to a negligible amount, signal limiting means in communication with an output of the communication channel for developing a two-level signal being a function of the relative magnitudes of the channel output signal, second generating means for generating clock pulses and a second probe signal in response thereto corresponding to the first probe signal but with a controllably variable time delay $\tau$, means connected to the output of said signal limiting means and said second generating means for comparing the signal outputs thereof on a bit-by-bit basis with respect to the clock pulses, the output signal of said comparing means being at a first voltage level when the levels of the delayed probe signal and an output of said signal limiting means agree and being at a second voltage level when the levels disagree, and reversible counter means connected to an output of said comparing means for establishing a count which is the difference between the total number of agreements and total number of disagreements at the output of said comparing means over a particular time interval and from which a measurement of the cross correlation between the signal at the output of the communication channel and the probe signal may be determined.

2. The communication channel performance monitoring system set forth in claim 1 wherein said summing means is a two-input electronic operational amplifier, said signal limiting means, said comparing means and said reversible counter means forming a digital correlator to thereby adapt the system for wide bandwidth monitoring and small distortion level detection.

3. The communication channel performance monitoring system set forth in claim 1 wherein said comparing means is a modulo 2 adder circuit.

4. The communication channel performance monitoring system set forth in claim 1 wherein said signal limiting means is a hard limiter electronic circuit which develops higher and lower voltage levels of the two-level signal in response to channel output signals being of amplitude greater and smaller, respectively, than a predetermined decision value established by a bias voltage in the hard limiter circuit.

5. The communication channel performance monitoring system set forth in claim 1 wherein said signal limiting means, said comparing means and said reversible counter means are each only single components.

6. The communication channel performance monitoring system set forth in claim 1 wherein said signal limiting means, said comparing means and said reversible counter means forming digital correlator means, said signal limiting means, said comparing means and said reversible counter means each consisting of $2N+1$ components connected in an array of a $2N+1$ plurality of parallel connected digital correlators, the output of the communication channel connected to inputs of the $2N+1$ signal limiting means components, the output of said second generating means connected to inputs of the $2N+1$ comparing means components, and further comprising digital summing means having inputs thereof connected to outputs of the reversible counter means components for providing at the output of the digital summing means the difference between the total number of agreements and the total number of disagreements over the particular time interval, the plurality of digital correlators reducing the measurement time required for a desired accuracy of channel distortion measurement.

7. The communication channel performance monitoring system set forth in claim 6 wherein the $2N+1$ signal limiting means components are provided with $2N+1$ different bias voltages determining $2N+1$ predetermined decision values of the channel output signal magnitudes about which $2N+1$ two-level signals are developed.

8. The communication channel performance monitoring system set forth in claim 1 and further comprising means for automatically varying a bias voltage level in said signal limiting means in predetermined steps as a function of the channel output signal to thereby determine a plurality of predetermined decision values of the channel output signal magnitude about which the signal limiting means two-level output signal is developed, the plurality of decision levels reducing the measurement time for a desired accuracy of channel distortion measurement.

9. The communication channel performance monitoring system set forth in claim 1 and further comprising counter means in communication with said second generating means for establishing a count which is the sum of the total number of agreements and total number of disagreements and is equal to the number of clock pulses generated over the particular time interval, the cross correlation being determined by the count established by said reversible counter means divided by the count established by said counter means.

10. A method for monitoring the performance of a communication channel by determining the impulse response thereof employing polarity coincidence correlation for obtaining measurement of cross correlation between the channel output signal and a delayed locally generated pseudorandom noise sequence probe signal and comprising the steps of generating clock pulses and a first pseudorandom noise sequence voltage probe pulse signal in response to the clock pulses wherein the leading edges of the probe signal pulses coincide with the clock pulses and the periods of the probe signal pulses are random integral numbers of a clock pulse period, passing the first probe signal through the communication channel being monitored, limiting the signal output of the communication channel by developing a two-level signal as a function of the relative magnitudes of the channel output signal, generating a second probe signal corresponding to the first pseudorandom noise sequence signal but with a first variable time delay, comparing the delayed second probe signal and the two-level limited signal on a bit-by-bit basis with respect to the clock pulses, the signal comparison developing an output signal at a first voltage level when the levels of the delayed second probe signal and limited signal agree and at a second voltage level when the levels disagree, generating a count which is the difference between the total number of agreements and total number of disagreements of the compared delayed probe signal and limited signal over a particular time interval for a first selected delay in the second probe signal, and generating a count which is the sum of the total number of agreements and total number of disagreements and is equal to the number of clock pulses generated over the particular time interval to thereby determine a first measurement of the cross correlation between the signal at the output of the communication channel and the pulse signal by dividing the difference count by the sum count.

11. The method for monitoring the performance of a communication channel set forth in claim 10 and further comprising repeating the steps of generating a first probe signal, limiting the signal at the output of the communication channel, generating a second probe signal with a variable time delay, comparing the delayed probe signal and limited signal and generating counts which are respectively the difference between and sum of the agreements and disagreements over a particular time interval for a plurality of different variable time delays of the second probe signal including zero delay for determining a plurality of different measurements of the cross correlation between the signal at the output of the communication channel and the probe signal from which the channel impulse response is determined.

* * * * *